United States Patent
Colenbrander

(10) Patent No.: US 10,916,215 B2
(45) Date of Patent: *Feb. 9, 2021

(54) VIDEO FRAME RATE COMPENSATION THROUGH ADJUSTMENT OF VERTICAL BLANKING

(71) Applicant: Sony Interactive Entertainment LLC, San Mateo, CA (US)

(72) Inventor: Roelof Roderick Colenbrander, Costa Mesa, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,189

(22) Filed: May 28, 2019

(65) Prior Publication Data

US 2019/0279592 A1    Sep. 12, 2019

Related U.S. Application Data

(63) Continuation of application No. 15/991,860, filed on May 29, 2018, now Pat. No. 10,339,891, which is a
(Continued)

(51) Int. Cl.
*G09G 5/00* (2006.01)
*G09G 5/39* (2006.01)
(Continued)

(52) U.S. Cl.
CPC .............. *G09G 5/001* (2013.01); *G06F 3/14* (2013.01); *G06T 1/60* (2013.01); *H04N 5/04* (2013.01); *H04N 7/013* (2013.01); *G06F 3/1423* (2013.01); *G09G 5/395* (2013.01); *G09G 2310/062* (2013.01); *G09G 2310/08* (2013.01); *G09G 2340/02* (2013.01); *G09G 2340/0435* (2013.01); *G09G 2350/00* (2013.01); *G09G 2360/08* (2013.01); *G09G 2360/12* (2013.01);
(Continued)

(58) Field of Classification Search
CPC .. H04N 5/04; H04N 7/013; G06F 3/14; G06F 3/1423; G06T 1/60; G09G 5/001; G09G 5/395; G09G 2310/062; G09G 2310/08; G09G 2340/02; G09G 2340/0435; G09G 2350/00; G09G 2360/08; G09G 2360/12; G09G 2360/127; G09G 2370/022; G09G 2370/12
USPC .................................................. 345/501, 545
See application file for complete search history.

(56) References Cited

U.S. PATENT DOCUMENTS

| | | |
|---|---|---|
| 8,990,446 B2 | 3/2015 | Colenbrander |
| 9,086,995 B2 | 7/2015 | Colenbrander |

(Continued)

OTHER PUBLICATIONS

Co-Pending U.S. Appl. No. 14/135,374, to Roelof Roderick Colenbrander, filed Dec. 19, 2013.
(Continued)

*Primary Examiner* — Jacinta M Crawford
(74) *Attorney, Agent, or Firm* — JDI Patent; Joshua Isenberg; Robert Pullman

(57) ABSTRACT

Systems and methods are configured to adjust the timing of source frame compression in response to fluctuations in a variable frame rate at which source frames are rendered.

19 Claims, 8 Drawing Sheets

Related U.S. Application Data continuation of application No. 15/145,718, filed on May 3, 2016, now Pat. No. 9,984,647, which is a continuation of application No. 14/280,502, filed on May 16, 2014, now Pat. No. 9,332,216.

(60) Provisional application No. 61/951,729, filed on Mar. 12, 2014.

(51) Int. Cl.
| | |
|---|---|
| *H04N 7/01* | (2006.01) |
| *G06T 1/60* | (2006.01) |
| *H04N 5/04* | (2006.01) |
| *G06F 3/14* | (2006.01) |
| *G09G 5/395* | (2006.01) |

(52) U.S. Cl.
CPC . *G09G 2360/127* (2013.01); *G09G 2370/022* (2013.01); *G09G 2370/12* (2013.01)

(56) References Cited

U.S. PATENT DOCUMENTS

| | | | |
|---|---|---|---|
| 9,332,216 B2 | 5/2016 | Colenbrander | |
| 9,984,647 B2 | 5/2018 | Colenbrander | |
| 2005/0012754 A1* | 1/2005 | Inuzuka | G06F 3/14 |
| | | | 345/555 |
| 2006/0274830 A1 | 12/2006 | Koto | |
| 2010/0007673 A1 | 1/2010 | Swic | |
| 2010/0278230 A1 | 11/2010 | MacInnis et al. | |
| 2011/0157318 A1* | 6/2011 | Nalibotski | H04N 13/161 |
| | | | 348/47 |
| 2012/0206461 A1 | 8/2012 | Wyatt et al. | |
| 2013/0021352 A1* | 1/2013 | Wyatt | G09G 5/395 |
| | | | 345/520 |
| 2013/0128950 A1* | 5/2013 | Srinivasamurthy | H04N 19/149 |
| | | | 375/240.02 |
| 2014/0101341 A1 | 4/2014 | Colenbrander | |
| 2014/0101342 A1 | 4/2014 | Colenbrander | |
| 2014/0111512 A1 | 4/2014 | Huang | |
| 2015/0178018 A1 | 6/2015 | Colenbrander | |
| 2015/0181084 A1 | 6/2015 | Colenbrander | |
| 2015/0189126 A1* | 7/2015 | Xie | G09G 5/005 |
| | | | 348/500 |
| 2015/0264298 A1 | 9/2015 | Colenbrander | |
| 2015/0301960 A1 | 10/2015 | Colenbrander | |

OTHER PUBLICATIONS

Co-Pending U.S. Appl. No. 14/280,502, to Roelof Roderick Colenbrander, filed May 16, 2014.
Non-Final Office Action for U.S. Appl. No. 15/991,860, dated Oct. 2, 2018.
Notice of Allowance for Chinese Application No. 201510094508.7, dated Dec. 27, 2017.
Notice of Allowance for U.S. Appl. No. 15/145,718, dated Jan. 30, 2018.
Notice of Allowance for U.S. Appl. No. 15/991,860, dated Feb. 25, 2019.
U.S. Appl. No. 61/951,729, to Roelof Roderick Colenbrander, filed Mar. 12, 2014.

* cited by examiner

VIDEO FRAME RATE COMPENSATION THROUGH ADJUSTMENT OF VERTICAL BLANKING

CLAIM OF PRIORITY

This application is a continuation of commonly-assigned, U.S. patent application Ser. No. 15/991,860, filed May 29, 2018, now U.S. Pat. No. 10,339,891, the entire contents of which are herein incorporated by reference.

U.S. patent application Ser. No. 15/991,860 is a continuation of commonly-assigned, U.S. patent application Ser. No. 15/145,718, filed May 3, 2016, now U.S. Pat. No. 9,984,647, the entire contents of which are herein incorporated by reference.

U.S. patent application Ser. No. 15/145,718 is a continuation of commonly-assigned, U.S. patent application Ser. No. 14/280,502, filed May 16, 2014, now U.S. Pat. No. 9,332,216, the entire contents of which are herein incorporated by reference.

U.S. patent application Ser. No. 14/280,502 claims the priority benefit commonly-assigned, U.S. Provisional application No. 61/951,729, to Roelof Roderick Colenbrander, entitled "VIDEO FRAME RATE COMPENSATION THROUGH ADJUSTMENT OF VERTICAL BLANKING", filed Mar. 12, 2014, the entire contents of which are herein incorporated by reference.

FIELD

The present disclosure relates to graphics processing and video transfer. Certain aspects of the present disclosure relate to systems and methods for frame rate compensation when compressing and streaming rendered graphics over a network.

BACKGROUND

Rendering graphics for transfer to a display device in real-time is a complicated process that incorporates many well-developed techniques to ensure that newly generated frames are transferred from the source to the display with proper timing. Typically, the process begins with a processing unit, commonly a graphics processing unit (GPU) having a highly parallel architecture tailored to the rendering task, rendering each new frame of source content to a portion of memory known as the frame buffer. The newly generated frames of source content, referred to herein as "source frames," are each temporarily stored in the frame buffer in sequence as images having an array of values that define the visual contents for each pixel in that particular frame. While this is occurring, these images are scanned out of the frame buffer in a process that drives the images sequentially to a display device. Meanwhile, the display device traditionally updates the image displayed on the screen periodically at a fixed frequency, known as the refresh rate, using the images that are scanned out from the frame buffer.

In order to send the rendered frames to the display, the images in the frame buffer are typically scanned out line by line and transferred serially (in sequence) over some video interface to the display device. During scanout, certain "invisible" signals are generated to govern the transfer process, so that what is actually transferred to the display device for each frame that is output from the frame buffer, referred to herein as an "output frame," includes not only the visible pixel values of the frame's image, but other external signals which may be used by the display device to resolve how the received frame is displayed on the screen. This typically includes, among other things, a vertical synchronization signal that is pulsed between each scanned out frame image. The period of time between each scanned out frame image, i.e., between the last line or pixel of one frame image and the first line or pixel of the subsequent frame's image, is known as the "vertical blanking interval." This vertical blanking interval is generated as part of the scanout process, and this vertical synchronization pulse used for synchronization between graphics source and display.

The frequency at which the vertical synchronization pulse occurs during scanout, and, as a result, the frequency at which the vertical blanking interval occurs, is traditionally fixed in relation to the refresh rate of the display device, so that each image scanned out from the frame buffer coincides with each refresh cycle of the display. If the frame rate of the original graphics content, i.e., the rate at which new source frames are drawn to the frame buffer by the GPU, is perfectly in sync with the refresh rate of the display, each new source frame drawn to the frame buffer by the GPU would correspond 1:1 to each image presented on the display device. For example, if the display device has a refresh rate of 60 Hz and the GPU were rendering new images to the frame buffer at a frame rate of 60 FPS in phase with the refresh cycle of the display, each image updated on the screen of the display would perfectly correspond to the source frames generated by the GPU.

However, in practice the frame rate of the source content is often variable over time and may fluctuate upward and downward, e.g., based on the complexity of the current scene or other factors associated with the generation of the frames. For example, if the current state of a video game causes too many virtual objects or too much detail within the current field of view, the frame rate may momentarily dip due to an increased computational load required to render the frame. As a result, the frame rate of the source content rendered to the frame buffer may go out of sync with the scanout of the frames from this buffer and the corresponding refresh cycles of the display device. In other words, each "source frame" that is drawn to the frame buffer may not exactly correspond to each "output frame" that is driven to the display device.

An undesirable consequence which results from this desynchronization between source frame rate and display refresh is a visual artifact known as "tearing," aptly named because it appears as if there is a horizontal tear in the displayed image for a particular frame. Essentially, tearing occurs when a frame is scanned out of the frame buffer while that portion of memory is being updated with a new subsequent source frame, e.g., the GPU overwrites the image in the buffer with a subsequent source frame before it is finished being scanned out. As a result, the output frame that is transferred to the display device actually contains the images from two or more consecutive source frames. Correspondingly, when the display device updates its screen contents during that refresh cycle, it simultaneously contains images from different consecutive frames of the source content.

To minimize or eliminate tearing, the frame buffer commonly includes multiple buffers, i.e., a front frame buffer from which the frame images are directly scanned out, and one or more back frame buffers into which the GPU may draw new frames while a prior frame is being scanned out of the front frame buffer. When a new frame is finished rendering, a back frame buffer is swapped with the front frame buffer, e.g., by copying the contents to the front buffer or by changing a pointer value which specifies the memory address for the front buffer, so that the contents of the front buffer may be scanned out to the display device. In order to completely eliminate tearing artifacts, this is often combined with a restriction that prevents the GPU from swapping the buffers until just after a refresh cycle of the display device. This is typically accomplished by only forcing the GPU to wait for a vsync pulse occurring during the vertical blanking interval before it swaps the buffers. Since this vsync pulse and vertical blanking interval is traditionally generated at fixed intervals in relation to the refresh cycles of the display, it ensures that only whole source frames are scanned out of the frame buffer, preventing tearing artifacts from occurring.

While this is effective at preventing tearing, another problem known as "stuttering" may result, which may occur when the source frame rate drops and the scanout unit is forced to transfer an identical frame to the display. Stuttering may be especially pronounced when the GPU is restricted to only swapping the buffers between refresh cycles, since the frame rate is effectively restricted to only integral factors of the display refresh rate. Since the GPU must have a completed new source frame in order to perform the swap, if the GPU has not finished rendering the subsequent frame at the time of the synchronization pulse, it must wait another full cycle before it can swap the buffers, even if the new source frame is otherwise finished shortly thereafter. When stuttering occurs, the sudden drop in the perceived frame rate at the display can be distracting to the viewer.

In some instances, rather scanning frames out to a display device, it is desirable to send the frames to some other destination. For example, cloud gaming and other cloud-based video streaming applications may require rendered frames to be compressed and sent over a network for display in real-time, rather than transferred from the frame buffer directly to a display device. In these situations, preferably whole source frames are compressed by an encoder and sent to the remote device with minimized latency. To achieve this task, the encoder must operate on a restricted budget of resources to ensure the frames reach the remote device on time. If the source frame rate fluctuates and stuttering occurs, valuable compression resources would be wasted towards compressing an identical frame. This may result in poorer image quality in the encoded frames than might otherwise be achieved if the compression resources were more efficiently utilized. Furthermore, if identical frames are streamed over the network, limited network bandwidth is wasted on unnecessary frames.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DETAILED DESCRIPTION

Introduction

Although the following detailed description contains many specific details for the purposes of illustration, anyone of ordinary skill in the art will appreciate that many variations and alterations to the following details are within the scope of the invention. Accordingly, the exemplary embodiments of the disclosure described below are set forth without any loss of generality to, and without imposing limitations upon, the claimed invention.

It is noted that certain aspects of the present disclosure relate to video transfer, including rendering and scanning out video frames for transfer over a video interface (sometimes referred to herein as a display interface), as well as video streaming to remote devices, including compression and transmission of video frames for cloud gaming implementations. Further illustrative details and examples of these aspects may be found in U.S. Non-Provisional patent application Ser. No. 14/135,374, to Roelof Roderick Colenbrander, entitled "VIDEO LATENCY REDUCTION", filed Dec. 19, 2013, the entire contents of which are herein incorporated by reference. It is noted that certain implementations of the present disclosure may be configured in accordance with various systems and methods described in that incorporation by reference document.

Various aspects of the present disclosure relate to systems and methods configured to adjust the timing of compression to better match the frame rate at which source content is rendered by a processing unit. In certain implementations, this may be accomplished by adjusting the timing of frame scanout in response to detected fluctuations in the source frame rate. For example, a vertical blanking interval generated during scanout of frames from a frame buffer may be adjusted in response to detected changes in the frame rate at which the source content is generated. In certain implementations, other techniques may be used to adjust or avoid compressing or streaming duplicate frames, and rendered graphics may be streamed over a network for display in real-time on a remote device.

Details

Figure 1:
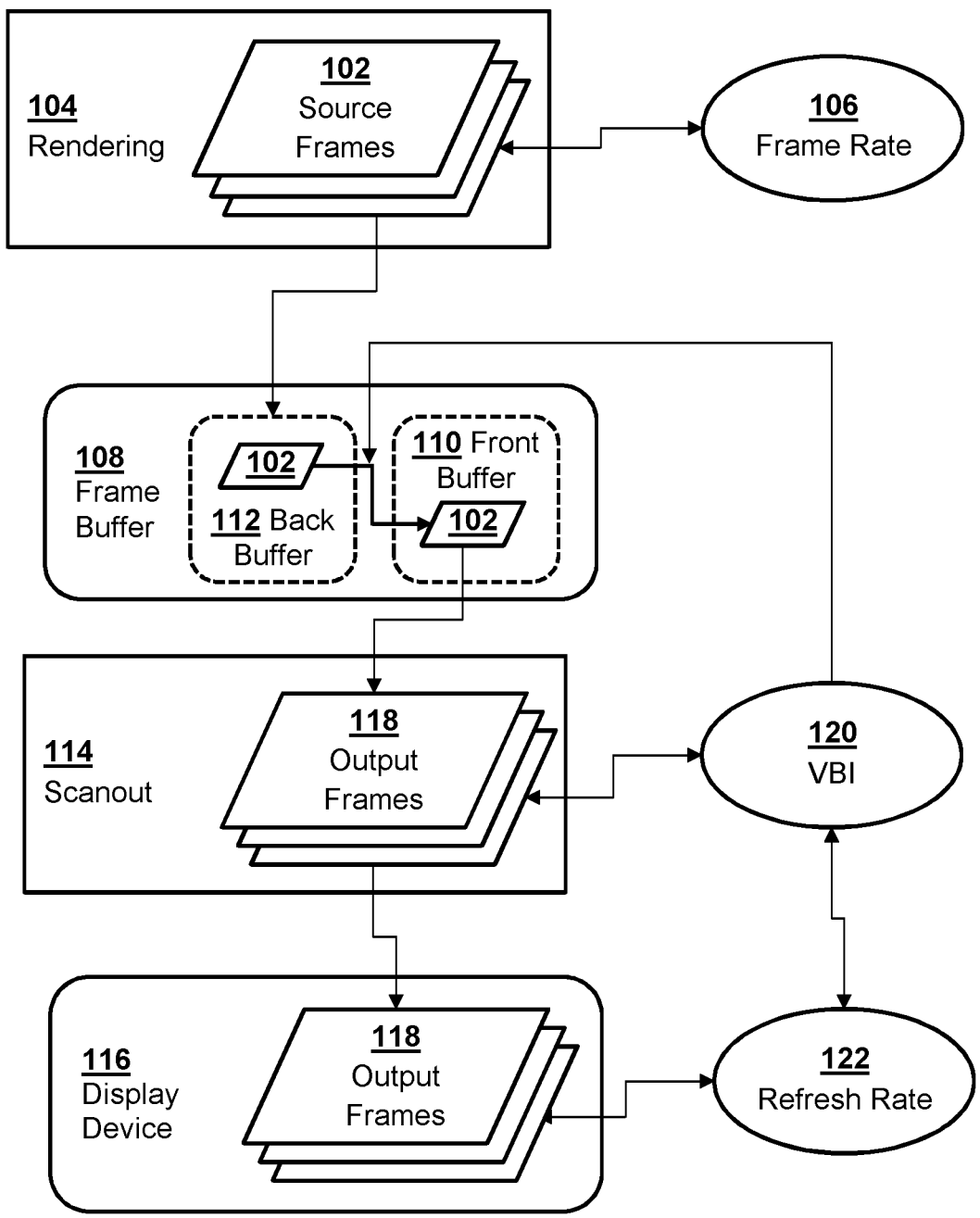
FIG. 1 is a flow diagram of an example of processing graphics and scanning out the graphics to a display device.

To better illustrate certain aspects of the present disclosure, an illustrative example of a technique for processing and transferring graphics to a display device in real-time is depicted in FIG. 1. The example depicted in FIG. 1 may have certain similarities to conventional techniques of transferring video frames to a local display device that utilizes a regular or fixed refresh rate.

In the example depicted in FIG. 1, graphics may be rendered, as indicated at 104, by a processing unit in order to generate a plurality of source frames 102 in sequence. By way of example, the source frames 102 may be rendered based on the state of an application, such as a video game, that determines the content of the source frames 102. The source frame rate 106, which defines the rate at which new source frames 102 are rendered, may be variable and contain one or more fluctuations over time based on, e.g., the complexity of the graphics or amount of detail in the source frames being rendered at that particular moment of time. In certain implementations, the processing unit which renders the source frames may be a GPU that contains a specialized architecture tailored to the task of processing graphics and rendering new source frames 102.

Rendering the source frames, as indicated at 104, may include a number of different steps depending on the configuration of the rendering pipeline, which may culminate in rendering the finished source frames 102 into a frame buffer 108, a portion of memory which temporarily stores each new source frame in sequence. Each source frame 102 may be stored in the frame buffer 108 as an image defined by an array of pixel data values which define the visual values associated with that particular frame.

During the process of rendering the source frames 102 into the frame buffer 108, the frame buffer contents may also be scanned out, as indicated at 114, as a sequence of output frames 118 and transferred to a display device 116 in sequence over a video interface connection, such as HDMI, DVI, VGA, or another suitable interface standard. During this process, the scanout unit may generate a vertical blanking interval at the end of each output frame 118, as well as various other external signals to govern the process of transferring the graphics frames from frame buffer 108 to display device 116. As such, each output frame 118 may be understood to contain not only the visible pixel values of the source frames 102, but also invisible external signals that are used to govern the timing and synchronize the transfer of the frames to display device 116.

The display device 116 may periodically update the image that is presented on its screen at a fixed refresh rate 122, utilizing the vertical blanking signal and/or various external signals associated with each output frame 118 to resolve the pixel data that is received from the frame buffer 108 and present only those pixel values associated with the image contents from the frame buffer. As such, in the example depicted in FIG. 1, the vertical blanking interval that is defined at the boundary between each output frame may be timed at a fixed frequency that coincides with the refresh rate 122 of the display.

In the example depicted in FIG. 1, to minimize or prevent tearing artifacts within each image of the output frames 118 that are transferred to the display, the frame buffer 108 may include multiple buffers, including a front buffer 110 and at least one back buffer 112. The rendering 104 of the source frames into the frame buffer may be performed in such a manner that new source frames 102 are rendered into the back buffer 112 while the front buffer 110 contains a source frame 102 that has not yet been scanned out to the display device 116. The front buffer 110 and the back buffer 112 may be swapped only after a new source frame is finished being rendered into the back buffer 112.

The timing of the swap of the buffers 110, 112 may depend on the current configuration of the system. In the illustrated example, the swap is timed to coincide with the timing of a pulse within the vertical blanking interval (VBI) 120, thereby restricting a swap from occurring during the middle of the scanout of any particular image from the front buffer 110. However, it is noted that the system may instead be configured to swap the front and back buffer as soon as the new source frames are ready, e.g., as soon as they are finished rendering into the back buffer 112. In these instances, tearing artifacts may still be reduced, but may not be completely eliminated since it is still possible for the buffers to be swapped in the middle of scan out of a particular source image from the frame buffer 108.

It is noted that, in the example depicted in FIG. 1, the vertical blanking interval 120 may be restricted to occur at regular, isochronous intervals to ensure proper transfer of the frames in sync with the fixed refresh rate 122 of the display hardware.

Figure 2:
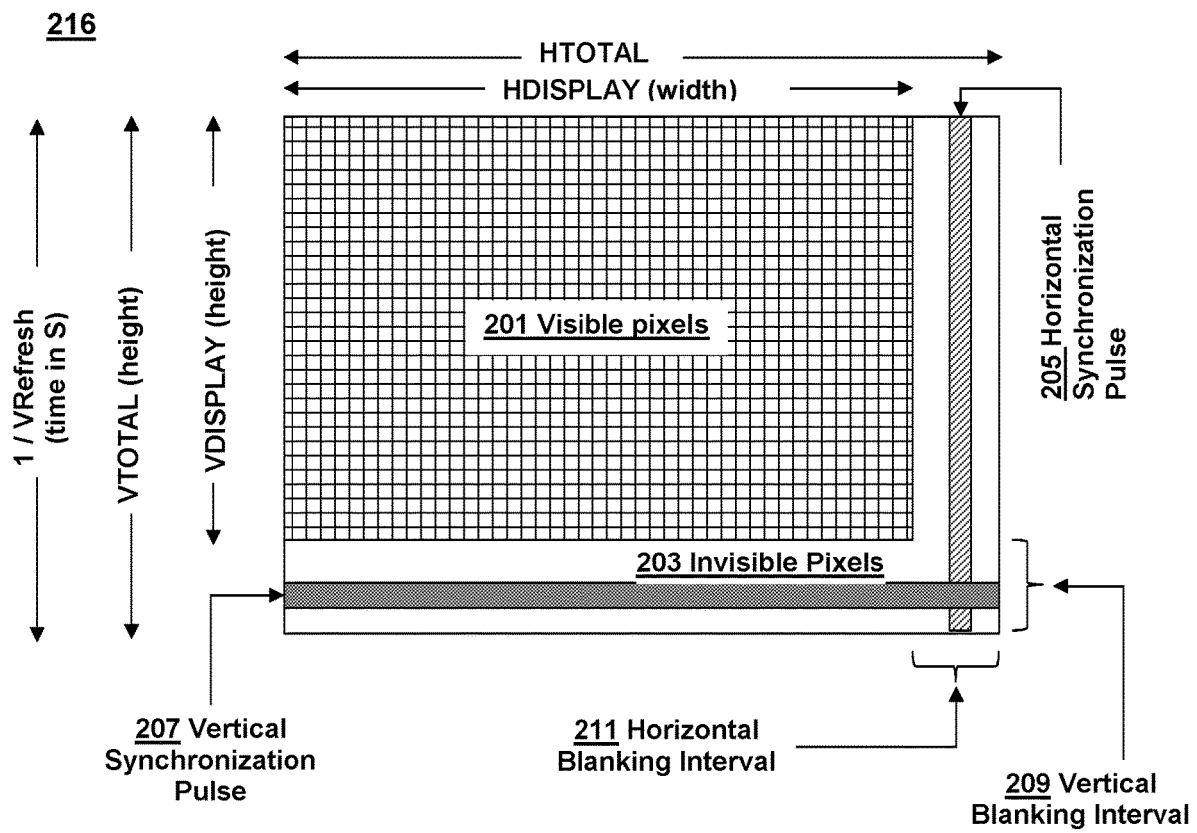
FIG. 2 is a schematic diagram of an example output frame.

Turning to FIG. 2, an illustrative example of an output frame 216 is depicted. To better appreciate various aspects of the present disclosure, it is beneficial to discuss in more detail how frames are transferred from a frame buffer through a video interface/display interface, such as HDMI, DVI, VGA, DisplayPort, and the like. The output frame 216 illustrated in FIG. 2 is a visual depiction of the content of each output frame scanned out of a frame buffer, e.g., as shown in FIG. 1, that is scanned out for transfer to a display device or other destination. The example output frame 216 may be one frame in a sequence of similarly formatted frames which collectively make up a video stream. The video frame sequence may generated by some video content source, such as a video game application, video file, live stream, and the like.

As shown in FIG. 2, the output frame 216 may be made up of an array of pixels, which can be represented by a corresponding array of pixel data values. The output frame 216 may also be transmitted with additional signals external to the pixel data values, as described below.

Each pixel data value in the array may include a plurality of color space components depending on the particular color model used. For example, each pixel data value in the array may include two chroma (color) values and luma (intensity) value for the corresponding pixel, if a YCrCb (digital video) or YPbPr (analog video) is used. Alternatively, RGB color space, or some other set of color space components may be used for the pixel data of each pixel. Moreover, the pixel data values for each color space component of each pixel may be digitally represented by a plurality of bits. For example, a 24-bit color depth may utilize 8-bits per color space component per pixel. The term "pixel" is sometimes used herein as shorthand when referring to that portion of an output frame that corresponds to a single tick of a pixel clock.

In addition to pixel data values, an output frame may also include external signals in addition to the pixel data values. The external signals may include a signal having information indicating whether the pixel is visible, e.g., a data enable signal indicating whether the pixel is meant to be displayed and therefore has a visible pixel contained in the pixel data values for that pixel. As can be seen in the example output frame 216 of FIG. 2, the total number of pixels in the array includes both visible pixels 201 (illustrated in the figure as a grid), and invisible pixels 203 (illustrated in the figure as the blank and lined regions). In the example frame of FIG. 2, the visible pixels 201 make up the active image region of the output frame, which may be indicated by a high data enable value, and the invisible pixels 203 make up the blanking region of the output frame in this example (e.g., including both horizontal and vertical blanking regions), which may be indicated by low data values. The visible pixels 201 in the active image region may collectively make up the visible image of the frame that is meant to be displayed. In particular, in this example the active region having visible pixels 201 is made up of the source content and their corresponding pixel values which are retrieved from the frame buffer during the scan out of the frame.

It is noted that in the example output frame 216 of FIG. 2, the visible pixels of the video frame image coincide with the active region of the frame's format. However, it is noted that the present disclosure is not limited to this situation, and certain implementations of the present disclosure may actually include invisible pixels that are not only in the blanking region, but are also within the active image region of the output frame that is retrieved from the frame buffer. For example, as described in U.S. application Ser. No. 14/135, 374, entitled "VIDEO LATENCY REDUCTION" and fully incorporated by reference herein, the active image region of an output frame may include invisible pixels if the GPU is configured to render source frames to the frame buffer in a larger format that contains more pixels than the actual source content, such as, e.g., in accordance with the techniques described with reference to FIGS. 7A-8 of that application Ser. No. 14/135,374.

Most devices, e.g., consoles, PCs, phones, and other video sources, render video frames to a frame buffer organized in RGB pixels with typically at least 8-bit/1-byte per color component. The video signal generated by a video transmitter, which may be part of the GPU that renders the video frames or which may be external to the GPU, may transport pixels in RGB, but it can do so in other color space models, such as YCrCb (digital video) or YPbPr (analog video), in case something (e.g., the transmitter) has to convert from RGB to the other format.

Once a GPU has completed rendering, it may scan the frame out, which is the process of sending the frame pixel by pixel over some serial connection (e.g., HDMI, DVI, etc.). The scanout process may involve the generation of the external signals of each output frame 216, and the scanout process may partly depend on the type of video connection, as well as whether the video transmitter is inside the GPU or outside it. In general the GPU may generate a plurality of signals when scanning the frame out, including signals external to the pixel data values. Generally speaking, these signals may be understood to be separate signals that occur simultaneously with each other during the scanout and transfer of the frame. The signals when scanning the frame out may include:

pixel clock signal
   data enable signal
   horizontal synchronization (hsync) signal
   vertical synchronization (vsync) signal
   data bus signals that carry color space components for active pixels (e.g., RGB, 24-bit wide, with 8-bits per color space component)

During scanout of the rendered frame, the GPU may retrieve the pixels from the frame buffer that holds the completed source frame (e.g., the frame buffer). As an example, say the GPU is currently at the first pixel of a line. For the given line, it will place a new pixel data value on the data bus signals at each "tick" of the pixel clock signal. Also it will output a high level on the data enable signal corresponding to that pixel.

At the end of the line there is a horizontal blanking period (of duration HTOTAL−HDISPLAY pixels, or pixel clock pulses). During the blanking period several signals change. First of all, a pulse may be generated in the hsync signal to notify a transition to the next line. The data enable signal is made low, which means that any data currently on the data bus signals that ordinarily carry color space components should not be interpreted as pixels (these are the invisible pixels at the end of the line).

This process may continue line by line until the end of the frame image. At the end of the output frame, after the full source frame image has been retrieved, e.g., after all the visible pixel data values have been retrieved from the frame buffer, a pulse may be generated in the vsync signal, within the vertical blanking region of the output frame. In particular, this interval of time during the scanout process, at the end of the output frame and after the full source frame image from the frame buffer has been retrieved is known as the vertical blanking interval 209. For any of the invisible lines during the vertical blanking interval at the end of the output frame 216, the data enable line is also low.

Generally, whenever the data enable signal is low, the pixel is invisible, and the pixel data values of the data bus signal do not contain the desired color space values which correspond to the display region of the image. Since there is always an active pixel clock, invisible pixels are essentially generated on the data bus signal. It is noted that horizontal and vertical synchronization signals are separate from the pixel data of the data bus signal.

The process of transmitting video signals, e.g., made up of output frames 216, over a serial interface may depend on the video technology. For classic VGA, the described signals are actually directly consumed by the monitor, including the pixel data signal and the external signals associated with the output frame. The external signals may include timing signals directly used for VGA. The pixel data signals may be analog signals in which each color component has its own channel, e.g., a red signal channel, a green signal channel, and a blue signal channel. A Digital to Analog Converter (DAC) may generate the analog pixel signal from the digital data bus signals (from the described 24-bit with 8-bit per channel). For other technologies like DVI, HDMI, or DisplayPort, a transmitter may accept the above described signals and convert them to a signal appropriate for that technology. In case of HDMI, the HDMI transmitter has 3 TMDS data channels (TX0 to TX2) and a TMDS clock, in which the HDMI transmitter at the video source embeds all the signals (hsync signal, vsync signal, pixel data bus signal) and TMDS clock contains the pixel clock signal in some way. The HDMI receiver on the other end of the HDMI connector (e.g., HDMI cable) inside the video sink (e.g., the HDMI receiver inside the display device, video capture card, or other video sink), has these signals as inputs, but recovers hsync, vsync, data, and the other signals. This is also true for other video standards like DVI or DisplayPort.

If the video transmitter is internal to the GPU, the scanout logic may operate on the described signals, but the scanout logic may also directly output, e.g., HDMI, bypassing the intermediate step for these other signals.

The pixel data values and other signals associated with each pixel for the output frame are typically output line by line, with each line containing a plurality of pixels and each frame containing a plurality of lines. Normally, these lines are horizontally oriented relative to the image that is displayed, and the pixels in a horizontal line may be transferred in sequence, e.g., serial transfer, from left to right in the line through a video communication interface from the video source to the display device or other video sink device. Similarly, the horizontal lines may be output in sequence from top to bottom until the end of the frame is reached. Accordingly, all the pixels in the output frame 216, including both visible 201 and invisible pixels 203, may have a defined sequence for transfer, and the lines during the vertical blanking interval 209 may be located at the end of this sequence for each output frame 216.

In the example output frame 216 of FIG. 2, each line of the frame is a horizontal line having a total number of pixels HTOTAL, which may define the total horizontal resolution of the output frame. Similarly, the example output frame 216 has a total number of lines VTOTAL, which may define the total vertical resolution of the frame. Thus, the total horizontal and vertical resolution includes both visible and invisible pixels.

The active display region 201 of the frame, e.g., the region retrieved from the frame buffer, may include a plurality of active lines VDISPLAY defining the vertical display resolution of the frame, and each active line may include a plurality of active pixels HDISPLAY, which defines the horizontal display resolution of the frame. The active display region 201 may correspond to that source frame that is rendered by a GPU into the frame buffer as described above.

It can be appreciated from the forgoing that the total resolution (e.g., HTOTAL×VTOTAL) of the output frame 216 may be greater than the display resolution (e.g., HDISPLAY×VDISPLAY) of the output frame, due to the presence of the blanking region and invisible pixels 203 in the frame, which may be generated during the scan out of the source frame, e.g., as described above. Specifically, the active display region corresponds to those pixels retrieved from the frame buffer, while the blanking region refers to those pixels generated due to the addition of external signals and extra ticks of the pixel clock generated during scanout. The blanking region may include a plurality of invisible pixels at the end of each line, corresponding to the horizontal blanking interval, and a plurality of invisible lines at the end of each frame, corresponding to the vertical blanking interval 209. Generally speaking, the synchronization pulses in the blanking regions may be provided to synchronize the video stream transfer between the video source and a display, with the horizontal synchronization pulses 205 within the hsync signal generally indicating the transitions between each line in the frame, and the vertical synchronization pulses 207 generally indicating the transitions between each frame in the sequence of output frames that makes up the video stream. While the hsync and vsync signals are external signals that are not part of the pixel data, e.g., RGB values and the like, since the GPU always outputs the pixel data and synchronization signals on the pixel clock, there happen to be invisible pixels in the pixel data bus signal during the period when pulses on hsync or vsync lines are active. Likewise, the hsync and vsync signals may be inactive during the period corresponding to those visible pixel values on the pixel data bus signal. In the case of HDMI, hsync and vsync are actually transported in the pixel data. Then, after transport over an HDMI cable, the HDMI receiver would separate the signals again.

As can be seen in the example of FIG. 2, transferring the pixels of the frame 216 in sequence, e.g., pixel by pixel, will result in the pixels corresponding to the horizontal blanking interval 211 being transferred at the end of each line, and the pixels corresponding to the vertical blanking interval 209 being transferred at the end of the frame 216. The horizontal synchronization signal may include horizontal synchronization pulse 205 during the horizontal blanking interval 211, with a corresponding horizontal front porch and horizontal back porch (illustrated in the diagram as blank regions before and after the horizontal synchronization pulse 205, respectively), and the vertical synchronization signal may include a vertical synchronization pulse 207 with a corresponding vertical front porch and vertical back porch (illustrated in the diagram as blank regions before and after the vertical synchronization pulse 207, respectively), and these pixels may collectively make up the invisible pixels 203 in the example output frame 216.

With reference to the example of FIG. 2, a video signal may be made up of a plurality of output frames similar to the example illustrated in FIG. 2, and output frames may be transferred from a video source to a display device, video capture device, or other video sink device through a video interface, such as HDMI, DVI, VGA, and the like. Generally speaking, a refresh rate (e.g., VRrefresh) of display hardware should correspond to the rate at which frames are scanned out of the frame buffer in an output video stream. As a consequence, the timing of the transfer of pixels through an interface between a video source and a display device should be synchronized in order to ensure that the rate of transfer of the pixels in the video stream is synchronized with the display and keeps up with the display refresh rate.

Typically, a pixel clock, which may be an external signal generated by electronics or other components embodied in the video transfer hardware and which may be generated in association with the scan out of the frames as described above, governs the timing for the transfer of each pixel between video source and video sink. Generally speaking, the pixel clock will control the timing of the transfer of pixels so that the total number of pixels within each frame is transferred from the video source at a rate that is in sync with the refresh rate of the display device. For a serial interface in which pixels are transferred sequentially, one after another, the pixel clock may be mathematically expressed as a product of the total number of pixels within each line, the total number of lines within each frame, and the vertical refresh rate as follows:

$$\text{Pixel Clock} = H\text{TOTAL} * V\text{TOTAL} * V\text{Refresh}$$

Standard video interfaces typically support different display resolutions (e.g., HDISPLAY×VDISPLAY), such as 720p (1280×720), 1080p (1920×1080), and the like, which each have a different total number of pixels for each frame. A pixel clock generator, which may be embodied in the video transfer hardware, may be configured to generate a pixel clock for a given video resolution and/or frame rate based on a formula similar to the mathematical expression shown above, e.g., based on the refresh rate and the resolution of each frame. It is noted that the upper bounds of the pixel clock may be limited due to practical considerations and technical requirements of the electronics and components involved, as well as a practical limit to the frequency at which the pixel clock may be accurately maintained. For example, display manufacturers typically want to keep the pixel clock as low as possible because the higher it is, the more it complicates the design of the electronics and the component costs. As a result, with reference to FIG. 2, the number of active lines (VDISPLAY) and total number of lines (VTOTAL) in a frame are typically close in value because only a small number of lines are required for the vertical synchronization signal, and conventional wisdom generally dictates that utilizing more lines than necessary is undesirable.

Various implementations of the present disclosure may incorporate techniques for decreasing the time to transfer an output video frame by artificially increasing the total number of pixels, i.e., ticks of a pixel clock, in a frame beyond what is needed to encompass the visible pixel data and/or synchronization signals within each output frame. As a result, a pixel clock rate may be increased to output the greater number of total pixels, causing the desired visible pixels embodying the visible video frame image within the active region of the output frame to be transferred in less time. In some implementations, this may be accomplished by increasing the number of lines at the end of each frame's sequence or otherwise putting the output frames in some frame format that has a greater number of total pixels than the source frame image.

By way of example, and not by way of limitation, for the example output video frame 216 depicted in FIG. 2, assuming a 60 Hz refresh rate (VRefresh), all the visible image lines of an output frame will have been output every VDISPLAY/VTOTAL*1/60 Hz, e.g., based on the ratio of the active display lines to the total number of lines in the frame. Where VDISPLAY and VTOTAL are close in value, the time to output the image 201 within the frame would be roughly ~1/60 Hz, which corresponds to 16.7 ms. In accordance with various aspects of the present disclosure, this time to output the visible image lines of a frame may be reduced by making VTOTAL significantly larger than VDISPLAY. Thus, for the same 60 Hz vertical refresh rate mentioned above, if VTOTAL is twice the size of VDISPLAY, that is the total number of lines within a frame is double the number of visible/active lines within the frame, the transfer time reduces to 8.3 ms, since after VDISPLAY/VTOTAL=0.5*16.7, the desired image within the frame would be transferred. VDISPLAY/VTOTAL may be made smaller, for example, by adding lines to the frame in some fashion. Further examples of techniques for reducing video transfer latency and forming output frames having artificially increased numbers of pixels are described in U.S. application Ser. No. 14/135,374, entitled "VIDEO LATENCY REDUCTION" and fully incorporated by reference herein. It is noted that implementations of the present disclosure may utilize any of the techniques for forming output frames described in that document.

Figure 3:
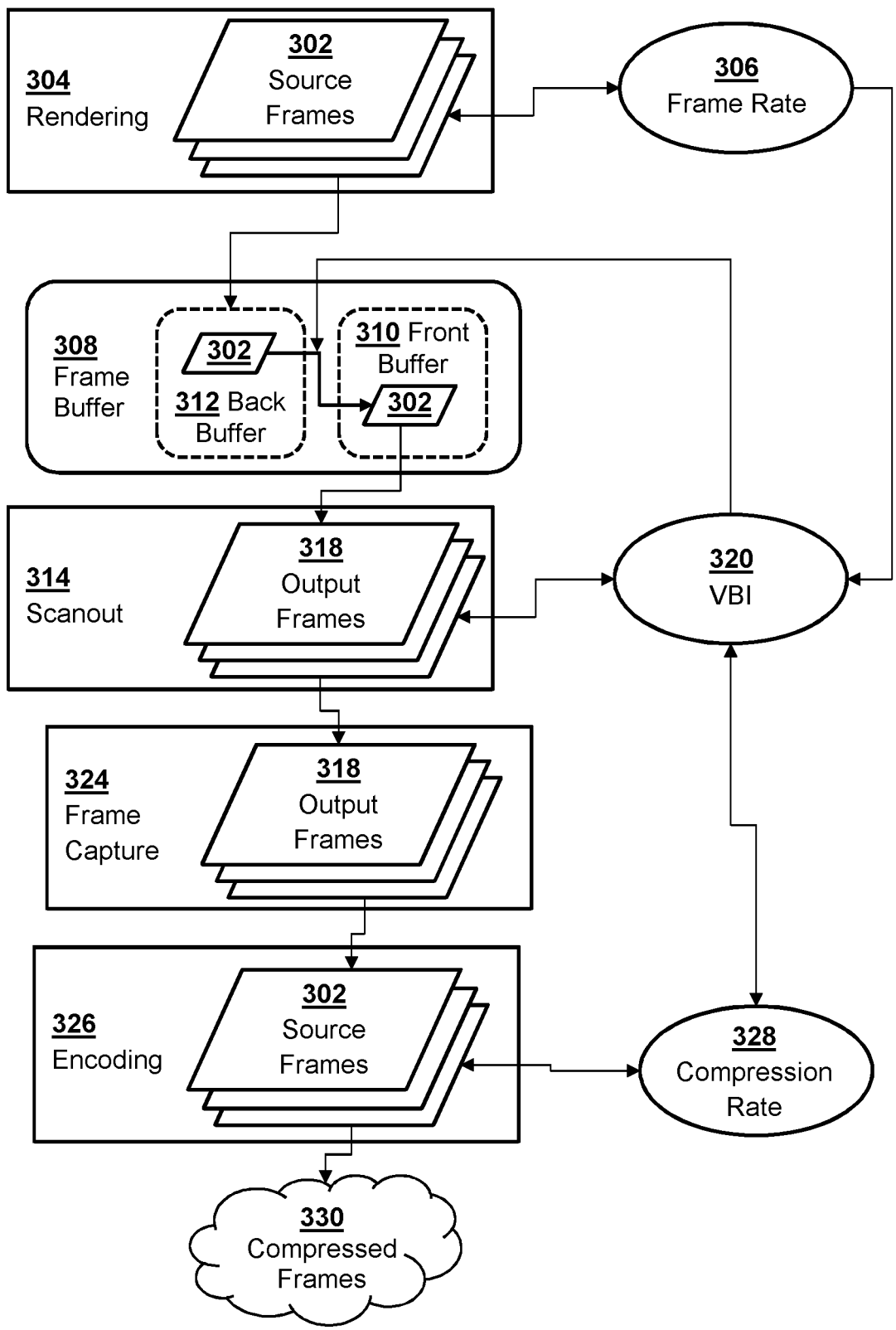
FIG. 3 is a flow diagram of an example of processing graphics and scanning out the graphics to an encoder for streaming the graphics in real-time.

Turning now to FIG. 3, an illustrative example of a technique for processing and transferring graphics in real-time is depicted. Unlike the example depicted in FIG. 1, the example depicted in FIG. 3 involves scanning out the rendered frames to a video capture unit instead of directly to a display device that refreshes at fixed intervals. In the example depicted in FIG. 3, captured frames may be further compressed using a video encoder so that, e.g., rendered graphics may be transmitted over network to a remote device for display in real-time.

Turning to the example depicted in FIG. 3 in more detail, graphics may be rendered, as indicated at 304, by a processing unit in order to generate a plurality of source frames 302 in sequence. By way of example, and not by way of limitation, the source frames 302 may be rendered based on the state of an application, such as a video game, that determines the content of the source frames 302.

The frame rate 306 of the source content, which defines the rate at which new source frames 302 are rendered, may be variable and contain one or more fluctuations over time based on a variety of factors, such as the complexity of the scene currently being rendered. In certain implementations, the processing unit which renders the source frames may be a GPU that contains a specialized architecture tailored to the task of processing graphics and rendering new source frames 302.

Rendering the source frames, as indicated at 304, may include a number of different steps depending on the configuration of the rendering pipeline, which may culminate in rendering the finished source frames 302 into a frame buffer 308. Each source frame 302 may be stored in the frame buffer 308 in sequence as an image defined by an array of pixel data values, e.g., a bitmap image (bmp), which define the visual values associated with that particular source frame.

During the process of rendering the source frames 302 into the frame buffer 308, the frame buffer contents may also be scanned out, as indicated at 314, as a sequence of output frames 318 and transferred to a video capture unit 324 in sequence over a video interface connection, such as HDMI, DVI, VGA, or another suitable display interface standard. In certain implementations, a video capture card or other device may be used for the frame capture 324, and the video capture unit may be that may be configured to capture only the set of visible pixels within each output frame that correspond to the source frames rendered by the processing unit.

During this process, the scanout unit may generate several external signals, including a vertical synchronization signal. Generating the vertical synchronization signal may also involve the generation of one or more active vsync pulses after each source frame 302 that is scanned out of the frame buffer 308, and, as a result, the generation of a vertical blanking interval 320 between each scanned out frame. This may result in the generation of invisible lines at the end of each output frame 318, e.g., as described above with reference to the illustrated example of FIG. 2. At least a portion of the vertical blanking interval may correspond to these invisible lines between each scanned-out source frame 302.

The frame capture unit may capture the source frames contained within each received output frame 318 in sequence, and may utilize the vertical blanking interval and/or various external signals associated with each output frame 318 to resolve the pixel data that is received from the frame buffer 308 and capture the rendered source frames corresponding to those visible pixels. Each captured source frame 302 may be then be compressed using a suitable video encoder, e.g., codec, as indicated at 326. The compressed frames 330 may then be optionally sent over a network for display on a remotely located display device.

In the example depicted in FIG. 3, to minimize or prevent tearing artifacts within each image of the output frames 318 that are scanned out, the frame buffer 308 may include multiple buffers, including a front buffer 310 and at least one back buffer 312. The rendering 304 of the source frames into the frame buffer may be performed in such a manner that new source frames 302 are rendered into the back buffer 312 while the front buffer 310 contains a source frame 302 that has not yet been scanned out. Generally speaking, the front buffer 310 and the back buffer 312 may be swapped only after a new source frame is finished being rendered into the back buffer 312.

The timing of the swap of the buffers 310, 312 may depend on the configuration of the system. In the illustrated example, the swap is timed to coincide with the timing of the vertical blanking interval (VBI) 320, thereby restricting a swap from occurring during the middle of the scanout of any particular image from the front buffer 310. More specifically, in the illustrated example, the back frame buffer 312 may be configured to swap with the front frame buffer 310 only in response to a vertical synchronization pulse that is generated during the vertical blanking interval during scanout 314 of the frames, and the vsync pulse which indicates to the processing unit that the buffers may be swapped may occur at or near the beginning of the vertical blanking interval. As a result, each output frame 318 may contain only whole source frames 302. If, alternatively, the system is configured to swap the front and back buffer as soon as the new source frames are ready, e.g., as soon as they are finished rendering into the back buffer 312 tearing may not be completely eliminated since it is still possible for the buffers to be swapped in the middle of scan out of a particular source image from the frame buffer 308. In these instances, the source frames within the output frame 318 that is scanned out may actually contain portions of consecutive rendered source frames.

In accordance with certain aspects of the present disclosure, frame rate of the source content 306 may be detected, and the vertical blanking interval 320 may be adjusted in response to fluctuations in the frame rate, thereby better matching compression rate and timing 328 to the source content. For example, if it is detected that the source frame rate 306 momentarily drops, e.g., due to the complexity of the scene, the vertical blanking interval 320 may be adjusted to delay scanout of one or more frames in response. This may be beneficial to avoid stuttering or other drawbacks associated with an instantaneous frame rate that is below normal, better matching the rate and timing of the compression and streaming to the source content.

Conversely, if it is detected that the source frame rate 306 is high, the vertical blanking interval 320 may be adjusted to scan frames out of the frame buffer 308 more quickly. This may be beneficial, for example, when an encoder is operating on a fixed budget per frame. If the encoder receives the frames sooner, it may be able to compress the frames at a higher resolution, thereby improving image quality for the remote viewer.

Figure 4:
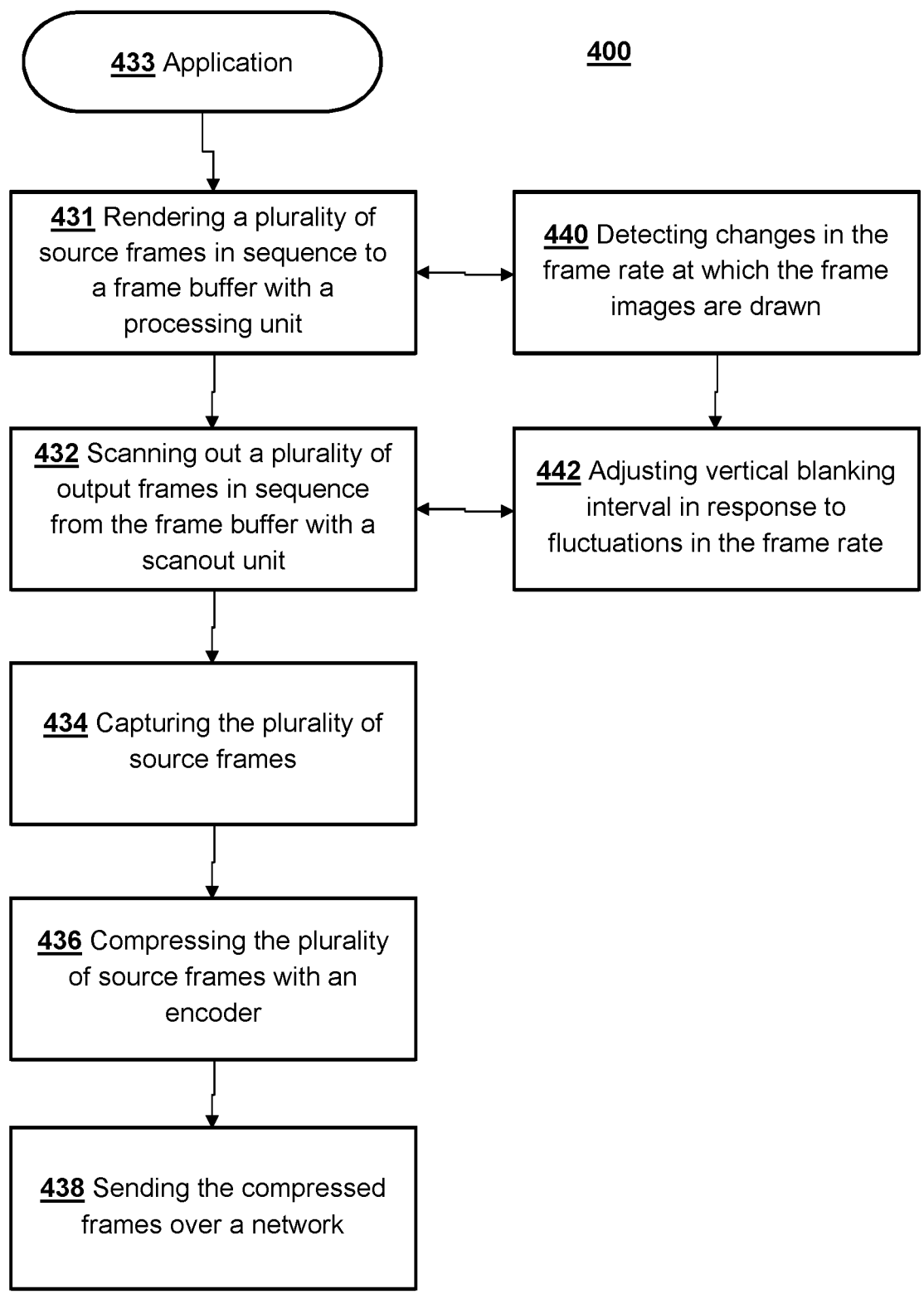
FIG. 4 is a flow diagram of an example method of frame rate compensation according to aspects of the present disclosure.

Turning now to FIG. 4, an illustrative example of a method 400 adjusting a vertical blanking interval in response to detected fluctuations in the frame rate of source content is depicted. The illustrative method of FIG. 4 may be involve a graphics processing and transfer technique that is similar to the example depicted in FIG. 3.

As shown in FIG. 4, the method 400 may include rendering a plurality of source frames in sequence into a frame buffer with a processing unit, as indicated at 431. Each new source frame may be rendered in response to one or more corresponding draw calls received based on an application 433 output. By way of example, and not by way of limitation, the processing unit for rendering the source frames may be a GPU having a specialized role of processing graphics for the application, while the application itself may be executed by a CPU. A graphics application programming interface (API) may coordinate draw calls from CPU to GPU in order to coordinate the processing tasks and initiate the generation of new source frames according to the state of the application.

As indicated at 432, the method may include scanning out a plurality of output frames in sequence from a frame buffer. In certain implementations, the frame buffer may include both a front buffer and one or more back buffers, and the frames may be scanned out directly from the front buffer while new source frames are being rendered into the back buffer. The scanout of the frames, as indicated at 432, may involve the generation of various external signals in addition to the pixel data that is scanned out of the frame buffer, including a vertical synchronization signal, as well as, e.g., a horizontal synchronization signal, pixel clock signal, and data enable signal as described above. The frames may be scanned out with a scanout unit that may include various components configured to generate the signals described above associated with the transfer of frames.

Each output frame that is scanned out of the frame buffer may include an image corresponding to a source frame rendered by the processing unit. As indicated at 434, the method may include capturing the source frames scanned out of the frame buffer. In certain implementations, the frames may be scanned out of the frame buffer and sent through a video interface connection to a video capture unit, which may capture the source content in step 434.

The method 400 may also include compressing the captured frames using an encoder, e.g., a video codec. The frames may be compressed in any of a variety of known video compression formats, such as h.264 or another suitable format for transmission over a network having a limited bandwidth. In certain implementations, the frames may be encoded using a low latency encoder for transfer to a remote device in real-time. The compressed frames may then be transmitted to one or more remote devices over a network, such as the Internet, as indicated at 438.

The illustrative method 400 depicted in FIG. 4 may also compensate for frame rate fluctuations in the rendering of source content in accordance to certain aspects of the present disclosure. This may include detecting one or more changes or fluctuations in the frame rate of the source content, as indicated at 440. In response to one or more fluctuations in the frame rate of the source content, a vertical blanking interval that is generated as part of the scanout process 432 may be adjusted to compensate for the frame rate fluctuations, as indicated at 442.

It is noted that by adjusting the vertical blanking interval in response to detected changes in the frame rate, the timing and rate of compression 436 and streaming 438 may be better matched to the rate at which the source content is generated at 431. In certain implementations, the method may involve delaying a scanout of one or more frames in response to one or more downward fluctuations in the frame rate in which the speed at which the source content is momentarily decreased. In other implementations, method may involve speeding up the rate at which frames are scanned out of the frame buffer in response to one or more upward fluctuations in the frame rate in which the speed at which the source content is increased. In yet further implementations, the method may involve both depending on the nature of the fluctuations in the source frame rate at different periods of time during the rendering process.

It is noted that the manner in which the frame rate is detected at 440 and the vertical blanking interval is adjusted at 442 may be performed in a variety of ways according to aspects of the present disclosure.

In certain implementations, the frame rate may be detected, as indicated at 440, by placing a marker into memory after each new source frame is finished rendering and tracking the timing between each marker. For example, a scanout unit and a processing unit, e.g., a GPU, may be controlled by a graphics driver (sometimes known as a "display driver" or "GPU driver") of a system that renders the source graphics. An application, which may optionally be implemented by separate processing unit, e.g., a CPU, may send drawing commands (e.g., draw calls) to the graphics driver, and the GPU may render the source frames to a frame buffer in response. When the frame is ready, the application may place a marker in a memory buffer, e.g., the back frame buffer, which notifies the GPU that the frame is ready. The graphics driver may track the time since the last "frame ready" marker, and the time between markers may be indicative of the frame rate of the source content. If the frame ready marker has not been received by some deadline, e.g., the time between consecutive markers exceeds some pre-defined time threshold between markers, then the graphics driver may delay scanout for the next frame. Accordingly, the graphics driver may be configured to track the time between each source frame that is finished rendering into the frame buffer, and whenever the time exceeds some pre-defined threshold, it may delay scanout of a subsequent frame for a finite period of time.

According to certain aspects of the present disclosure, the graphics driver may modify registers on the GPU (e.g. over the PCI-express bus) to adjust GPU state. In addition, the graphics driver may also send commands to the GPU, which is often done by sending one or more commands to the GPU using a command buffer. The main difference is that register access is synchronous (blocking), while sending commands through buffers is asynchronous. In the past everything was done using registers, which was typically slow, so presently registers are used mostly for configuration purposes.

In certain implementations of the present disclosure, in order to adjust the vertical blanking interval, as indicated at 442, the graphics driver may adjust a GPU register or send a command to the GPU through a command buffer that would delay the scanout. In certain implementations, the driver could send a command to put the scanout unit to sleep for a finite period of time, e.g., power down the scanout unit to delay scanout for a finite period of time. In certain implementations, the vertical blanking interval may be adjusted by maintaining an active vsync signal for a longer period of time between scanout in response to a slower frame rate, e.g., a detected downward fluctuation in the frame rate. For example, the graphics driver may generate dummy lines at the end of each frame, e.g., by maintaining an active vertical synchronization signal, until a frame ready marker is received. If the timing of the vertical blanking interval is synchronized to the time of the frame ready markers, then the rate at which frame are scanned out to a video capture unit and/or encoder may be better synchronized to the frame rate of the source content. This may result in a dynamic vertical blanking interval generated in by the scanout unit having a length varies with the frame rate. The net effect may result in the vertical blanking interval between scanned out frames being longer or shorter in response to changes in the frame rate of the source content.

It is noted that, in some instances, there may be a threshold in which a frame may need to be regenerated in order to maintain some activity. This threshold time maybe between 0.5 T and 2 T, where T=1/F, with F being a standard frame rate, e.g., 60 frames/sec.

It is noted that the implementation depicted in FIG. 4 is provided for purposes of illustration only, and implementations of the present disclosure include other techniques for compensating for frame rate beyond adjusting the vertical blanking interval as shown in FIG. 4.

In certain implementations, the rate of compression and streaming may be adjusted after the scanout phase in response to fluctuations in the source frame rate. For example, frames may be scanned out of the frame buffer and transferred using a display interface, which may a video transmitter and receiver. When the frame rate fluctuates downward, one or more components of the display interface may be momentarily disabled to prevent duplicate frames from being received by the encoder, thereby preserving compression resources. For example, the video transmitter may be momentarily disabled to prevent transfer of one or more frames to the encoder. It is noted that, in contrast to some of the implementations described above, this technique would only work to decrease the compression and/or streaming rate, but not increase it.

It is noted that many of the techniques described above may be particularly useful in implementations involving real-time streaming where the graphics content is generated by a first device and streamed by a separate device. For example, a cloud gaming implementation may involve source graphics content which is generated by a gaming console or other video gaming system, and the graphics frames may be scanned out to a separate streaming server system that then may capture, compress, and stream the frames to a remote client device. In these situations, the encoder may have no way of adjusting to the frame rate of the source content, since it is on a separate system and receives frames captured after scanout. Thus, adjusting the scanout and the vertical blanking interval generated during scanout in response to detected changes in the graphics source's frame rate may better match the timing of the frames received by the separate system.

However, certain implementations may involve an encoder and a streaming unit, such as streaming software, which operate on the same device as the graphics source. In these examples, it may be possible to perform the scanout in a conventional manner, and configure the encoder and/or the streaming unit to omit certain frames in response to detected changes in the frame rate of the source content. By way of example, and not by way of limitation, if the system detects that the source frame rate has momentarily dropped, the system may be configured to forgo the encoding of one or more frames received during scanout in response, e.g., to preserve compression resources. By way of further example, if the system detects that the source frame rate has momentarily dropped, the system may be configured to still encode the frame, but the streaming unit may forgo sending one or more duplicate frames in response, e.g., to preserve network bandwidth. If these units are all part of the same device as the graphics source, the graphics driver may be configured to notify the encoder and/or streaming software so that they can respond to fluctuations in the frame rate in this manner, which may not be possible when the encoding and streaming device is separate from the graphics source device.

Figure 5:
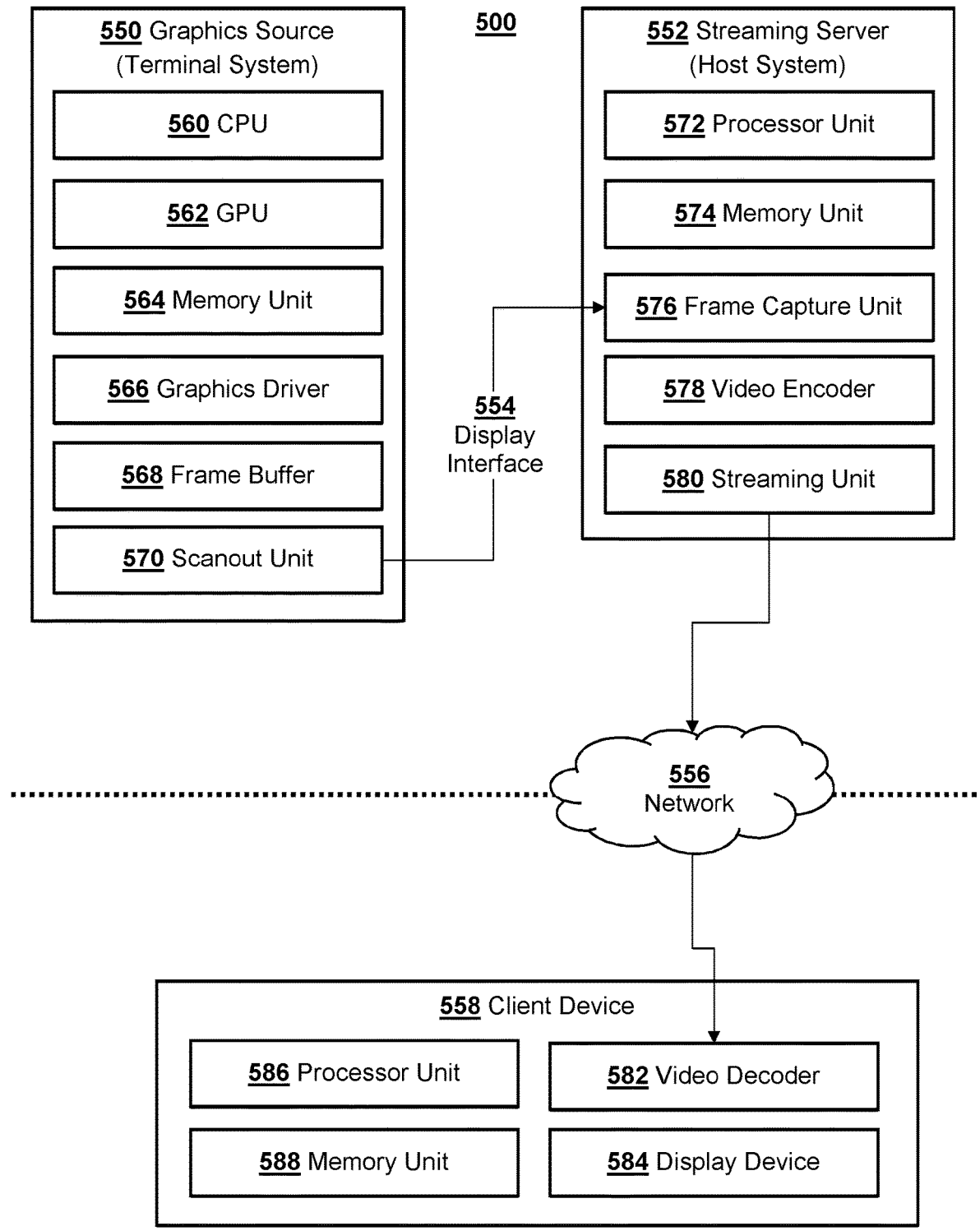
FIG. 5 is a block diagram of an example system according to aspects of the present disclosure.

Turning now to FIG. 5, an example system 500 is depicted to illustrate various aspects of the present disclosure. FIG. 5 provides an overview of an example hardware/software architecture of a system for generating, capturing, compressing, and streaming video frames according to various implementations of the present disclosure. The system 500 may be configured to compensate for frame rate fluctuations in rendered graphics content according to various aspects of the present disclosure. For example, the system 500 may be configured to perform a method having features in common with the method of FIG. 4.

Turning to FIG. 5 in more detail, system 500 may include a first computing device 550 and a second computing device 552 that are connected by a display interface 554 (sometimes also referred to herein as a "video interface"). The first computing device 550 may be a graphics source configured to generate and render graphics, and the second computing device 552 may be a streaming device configured to the compress frames and send the frames over a network 556 to a remote client device 558. The graphics source 550 may be a terminal of the streaming server 552 that is configured to scanout rendered frames to the host system 552 through a display interface connection 554, such as HDMI, VGA, DVI, and the like.

The graphics source device 550 may include one or more processing units 560, 562 and one or more memory units 564 configured to implement various aspects of graphics processing, transfer, and frame rate compensation in accordance with the present disclosure. In the illustrated example, the one or more processing units include at least two distinct processing units, a central processing unit (CPU) 560 and a graphics processing unit (GPU) 562. The CPU 560 may be configured to implement an application, e.g., a video game, the state of which may determine the content of graphics to be output. The CPU 560 may be configured to implement one or more graphics drivers 566 to issue drawing commands to the GPU 562, as well as control scanout of frames. In response to the drawing commands issued by the graphics driver 566, the GPU 562 may be configured to render new source frames into a frame buffer 568, which may be a portion of the one or more memory units that temporarily holds each rendered source frame in sequence. In certain implementations, the frame buffer 568 may include multiple buffers, including a front buffer and one or more back buffers, and the GPU 562 may be configured to swap the buffers when it is finished rendering new source frames in the back buffer.

The graphics source may also include a scanout unit 570, which may be configured to scan rendered frames out of the frame buffer 568 in accordance with various aspects described above. The scanout unit may be configured to scan output frames line by line directly out of a front buffer of the frame buffer 568, as well as generate a vertical synchronization signal and other external signals during the scanout process, e.g., as described above, and the vertical synchronization signal may be generated so as to generate a vertical blanking interval between each source frame that is retrieved from the frame buffer 568.

Various aspects of the scanout unit 570 the GPU 562 may be controlled by the CPU 560 via the one or more graphics drivers 566, which may be implemented as one or more software programs that cooperate with an operating system of the graphics source 550, and which may be embodied in a non-transitory computer readable medium for execution by the CPU or other processing unit. The graphics source device 550 may be configured to detect one or more fluctuations in the frame rate of the source content rendered by the GPU 562, and the device may be configured to the scanout in response to the one or more fluctuations. This may be accomplished, for example, by any of the techniques described with reference to FIG. 4.

In certain implementations, to detect the frame rate the one or more processing units 560, 562 may be configured to place a marker into the one or more memory unit 564 when each new source frame is rendered. For example, the one or more memory units 564 may contain a frame buffer 568 into which the GPU 562 renders new frames, and the GPU 562 may be configured to place a marker into the frame buffer 568 when it is finished rendering each new frame. The graphics driver 566 may track the timing of each new marker in the buffer 568 and may make adjustments in response to detected changes, e.g., as described above with reference to FIG. 4.

In certain implementations, the driver may be configured to make adjustments in the scanout timing to compensate for detected fluctuations in the frame rate rendered by the GPU 562. For example, it may be configured to adjust a vertical blanking interval in response to one or more fluctuations to increase or decrease an instantaneous rate of the scanout of frames. This may be accomplished, e.g., by the graphics driver 566 temporarily extending the portion of the vsync signal that is generated between frames or by putting the scanout unit 570 to sleep for a finite period of time. This may also be accomplished by temporarily disabling the display interface 554 momentarily to prevent the transfer of one or more frames.

The scanout of the frames by the scanout unit 570 may drive new frames to streaming device 552 over the display interface 554, as shown in FIG. 5. The streaming server 552 may include a frame capture unit 576, such as a video capture card, that is configured to capture the source frame images contained within each output frame transferred over the display interface 554. In certain implementations, the frame capture unit 576 may be specially adapted coordinate with the uniquely tailored frames that may be rendered by the GPU 562 and sent by the scanout unit 570. For example, in certain implementations, the frame capture unit may be configured to count the lines and/or pixels received in order to only capture those visible pixels which contain the desired source content.

The streaming computing device 552 may also include an encoder, e.g., a video codec, configured to compress the source frames captured by the frame capture unit 576. The streaming computing device 552 may also include a streaming unit 580 that is configured to send the compressed frames over the network 566 to one or more client devices 558. In certain implementations, the client 558 may also be a computing device having at least one processor unit 586 coupled to at least one memory unit 588, and the system 500 may be configured to implement video streaming in real-time, so that the client device 558 may decompress the received frames with a decoder 582 and display the frames with a display device 584 in real-time with minimized latency from when they are rendered by the GPU 562 of the graphics source 550.

While various components of FIG. 5 are depicted separately for purposes of explanation, it is noted that many of the illustrated components may be physically implemented as common or integral units.

For example, in certain implementations, the scanout unit 570 may be physically implemented as part of the GPU 562, or it may be a separate unit. Similarly, in certain implementations the scanout unit may be physically implemented as separate components or may be a physically integrated unit. The scanout unit 570 may generate a plurality of signals, including a vertical synchronization signal, a horizontal synchronization signal, a pixel clock, and the like. The scanout unit may be a single integral unit which contains components for generating all of these signals, or the scanout unit 570 may be made up distinct signal generators for these components. For example, a pixel clock generator of the scanout unit and a vertical synchronization signal generator of the scanout to not need to be part of the same physical chip.

By way of further example, the one or more memory units 564 may include a plurality of distinct memory units for different purposes. For example, the memory unit 564 may optionally include a dedicated graphics memory unit that is separate from a main memory unit. The graphics memory may be configured to hold the frame buffer, while the main memory may be configured to hold data and programs implemented by the CPU 560.

By way of further example, the video encoder 578 and/or the streaming unit 580 may optionally be implemented as one or more software programs which are configured to be stored on one or more memory units 574 and executed by the one or more processor units 572 of the streaming computing device 552. The encoder 578 and the streaming unit 580 may be separate sets of code or may be part of the same program in accordance with implementations of the present disclosure.

It is noted that the example depicted in FIG. 5 is a simplified schematic provided for purposes of explanation, but the system 500 may include many additional aspects to support graphics rendering, compression, streaming, and other features in support of cloud computing. Moreover, configuration of the illustrated example system 500 may be particularly beneficial in implementations involving cloud gaming for console platforms, and it is noted that the system 500 may be configured in accordance with systems described in U.S. application Ser. No. 14/135,374, entitled "VIDEO LATENCY REDUCTION" and fully incorporated by reference herein, to further support such applications.

Figure 6A:
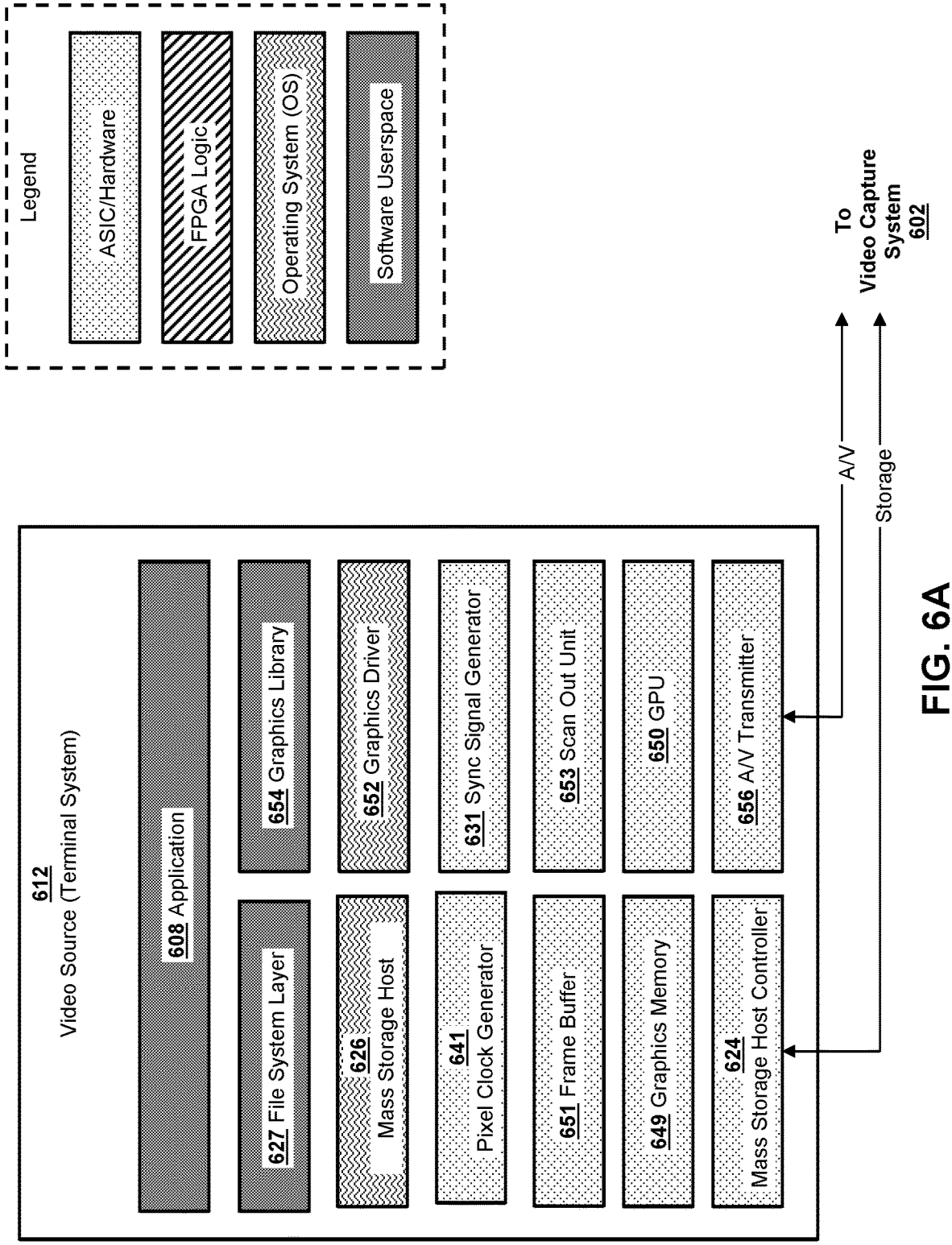
FIG. 6A is a schematic diagram of an example terminal system architecture functioning as a video source.

For example, the graphics source system 550 of the present application may have features in common with the terminal system depicted in FIG. 4A of that document, which corresponds to FIG. 6A herein. By way of further example, the streaming server 552 may have features in common with the streaming server depicted in FIG. 4B of that document (corresponding to FIG. 6B herein), and the frame capture unit 576 may have features in common with the video capture card depicted in FIG. 5 of that document (corresponding to FIG. 7 herein).

Figure 6B:
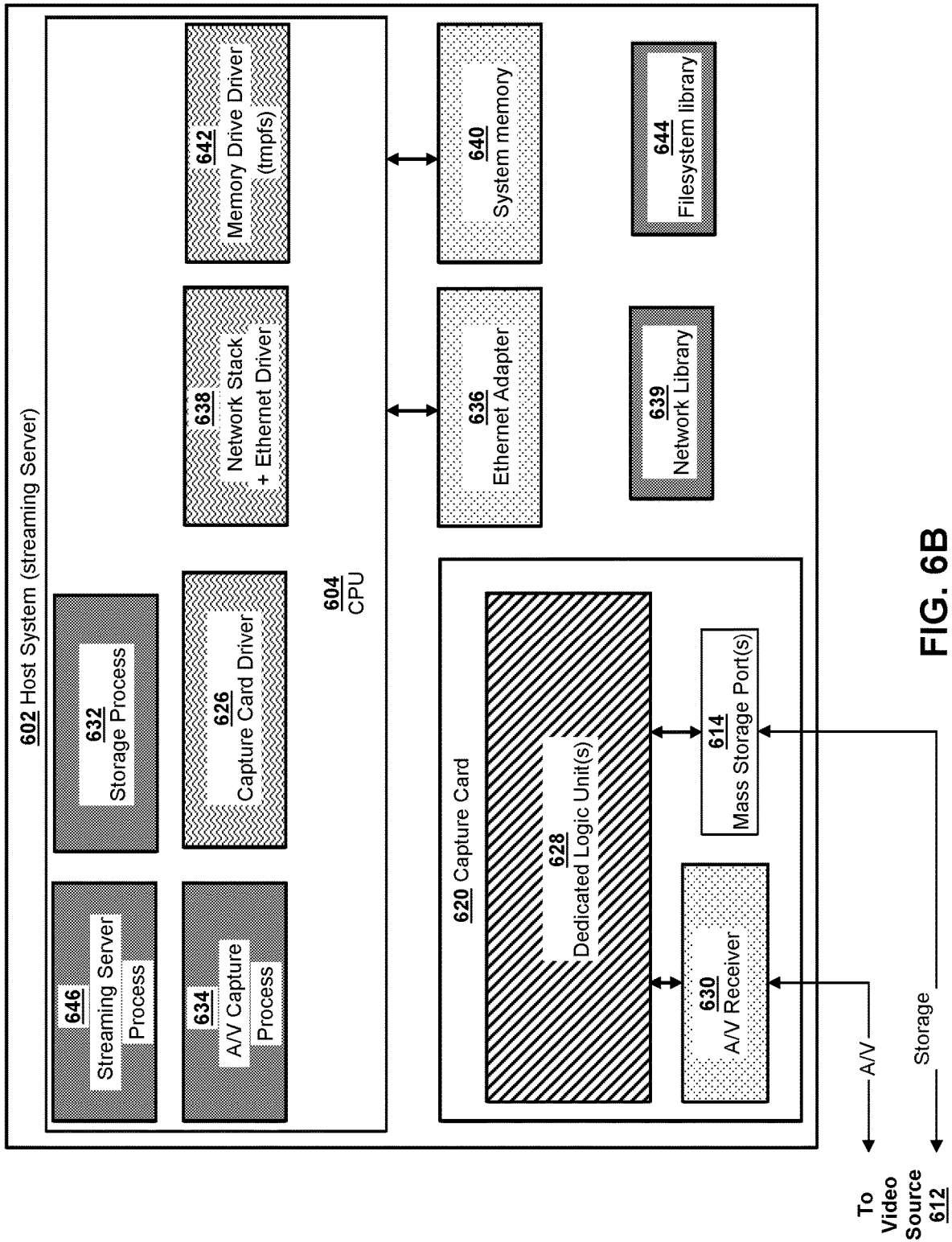
FIG. 6B is an example host system and capture card architecture which may capture and compress video frames from the video source.

FIGS. 6A and 6B provide an overview of an example hardware/software architecture for generating and capturing video frames according to various implementations of the present disclosure. In particular, the example system of FIGS. 6A and 6B may be a system for streaming video games and other applications using a streaming server and a terminal system. FIG. 6A illustrates an architecture for an example video source according to various aspects of the present disclosure, and FIG. 6B illustrates an architecture for an example video capture system for capturing video from the video source according to various implementations of the present disclosure. In some implementations, the video source 612 may be a terminal configured to run an application for cloud streaming, and may be an existing embedded system, video game console, or other computing device having a specialized architecture. In some implementations, the video capture system 602 (video sink) may be a streaming server configured to capture and stream the video output from the terminal system to a client device. However, it is emphasized that the illustrated architecture of FIGS. 6A and 6B is provided by way of example only, and that various implementations of the present disclosure may involve reducing video transfer time using other architectures and in other contexts beyond cloud gaming and cloud computing applications.

Turning to FIG. 6A, the example video source may be a terminal system 612 that is configured to run an application 608, which may involve a video output to be captured by the video capture system 602. By way of example, and not by way of limitation, the application may be a video game having rendered graphics as a video output, which may be transferred to the streaming server 602 for sending over the network. In particular, the terminal system may include graphics processing unit (GPU) 650, which together with the graphics memory 649 may be configured to render the application output 608 as a sequence of images for video frames. The images may be output as a sequence of video frames that have visible pixels which contain the pixel data for the image of each frame for display on a display device, and the video frame images may be sent to the video capture system 602 through a video interface, such as HDMI, as output frames having both visible and invisible pixels. However, in order to reduce delay stemming from the video capture process, the video source may be configured to add extra pixels so that enlarged output frames are sent through the video interface. Further examples of how extra pixels may be added to the output frames are described below.

In order to support the output of the video signal, the video source 612 may include a graphics driver 652 configured to interface with the GPU 650 for rendering the application video signal as a sequence of video frame images. In particular, the GPU 650 may generate video frame images for video signal output in accordance with the application 608, and the graphics driver 652 may coordinate with the GPU 650 to render the video frame images into source video frame format having a supported a particular display image resolution, e.g., 720p. The GPU 650 together with the graphics driver 652 may render video frame images in a format having a plurality of visible image lines, with each visible image line having a plurality of visible image pixels. In certain implementations, the graphics driver 652 may be configured to add extra pixels in addition to the frame image pixels rendered by the GPU, e.g., by rendering the frame in an enlarged frame having a greater resolution than the number of pixels in the video frame image. Further examples of enlarging a frame by rendering it in an enlarged frame format are described below.

More specifically, the video source 612 may include a frame buffer 651 and a scan out unit 653, which may be operatively coupled to the GPU 650, and, in certain implementations, may be embodied in the GPU 650. The GPU 650 may be configured to render video images to the frame buffer 651, e.g., based on the output of the application 608, and the scan out unit 653 may be configured to retrieve the frame images from the frame buffer 651 and generate additional external signals for sending the image as an output frame over the interface, e.g., as described above.

In particular, the scan out unit 653 may include a pixel clock generator 641 for generating a pixel clock signal the scan out of the frame and/or a sync signal generator 631 for generating the synchronization signals, e.g., hsync and vsync signals, with each output frame. For example, the sync signal generator 631 may add an hsync signal that has a horizontal blanking region at the end of each line of the frame, and corresponds to a plurality of invisible pixels at the end of each line of the frame. The signal generator 631 may also add a vsync signal that has a vertical blanking region at the end of each frame and corresponds to a plurality of invisible lines at the end of the frame. The pixel clock generator 641 may generate a clock signal having a pulse associated with each pixel in the output frame generated for transfer over the video interface, including the total number of active pixels retrieved from the frame buffer 651 and the total number of pixels corresponding to the synchronization regions inserted between the active pixels. It is noted that the pixel clock generator 641 and/or the sync signal generator 631 may be contained as part of the scan out unit 653, and the scan out unit 653 may be contained as part of the GPU 650. However, it is emphasized that this is just an illustrative example, and that one or more over the components may be implemented as separate components.

The video source may include a video transmitter 656 coupled to a video communication interface, and the transmitter may transfer the video signal to the video capture system 602 through a serial communication interface, e.g., pixel by pixel in sequence, with the sync signals indicating transitions between lines and frames in the sequence accordingly. The a pixel clock generator 641 which may generate a clock signal to synchronize the timing of each pixel, e.g., based on the total number of pixels and frame rate of the video content, as discussed above. In certain implementations, the pixel clock generator 641 may generate a pixel clock with increase transfer frequency in each pixel, based on extra pixels contained within the active display region within each image, extra pixels contained within the synchronization region, or both. Optionally, the video interface may also support audio transfer, such as with an HDMI interface, and an audio signal output from the application may also be submitted through the video interface. In alternative implementations, a separate audio interface may be used.

The video source may be configured to send the output video signal to a video capture device 620 coupled to a computing system 602. The capture device may receive the video pixel data contained in the transferred video signal so that it may be captured in digital form and compressed by the streaming server 602. The streaming server 602 may include a video capture process 634 and/or an encoder which may be configured to compress each video frame received from the video capture device. A streaming server process 646 may be configured to transmit the compressed video stream to a remotely located device so that the compressed video stream may be decompressed and displayed on a remote display device.

In certain implementations, the video capture device may contain video capture logic 628 which is specially configured to capture only the visible pixels of a video frame image contained within an enlarged frame in accordance with various aspects of the present disclosure. For example, in certain implementations, the graphics rendering components of the video source may be configured to insert the visible image pixels of a video frame image in only a portion of the active display region of a particular format, and the video capture device 620 may be configured to count lines and/or pixels within each frame that is received in order to know when capture of the display image is complete. This may be based on a predetermined configuration of how frames are rendered by the video source. Alternatively, the video capture device 620 may determine that capture is complete based on the presence of a synchronization signal, e.g., a VSYNC signal in implementations where frames are enlarged by adding synchronization lines. The streaming server 602 or other computing device may be configured to begin compression the video frames as soon as capture of the visible display image within each frame is complete.

The capture device may receive the video signal through communication interface that is compatible with the video signal output from the video source 612, and the video interface may be coupled to a video receiver 630. By way of example, and not by way of limitation, the video capture device may include one or more ports as part of an audio and/or video communication interface, e.g., HDMI ports or other ports as described below with reference to FIG. 7.

The interface device 602 may include a specialized processing unit containing the logic 628 that is operatively coupled to the video signal interface, with the specialized processing unit having logic 628 that is dedicated to performing functions associated with A/V capture, and optionally other functions associated with cloud streaming, for signals received through a connector from the terminal system 602. The logic 628 may also support communication with the host system 602 through an additional communication interface, which may communicate with a peripheral bus of the host system 602 in order to interface with an A/V process embodied in the host system. By way of example, and not by way of limitation, the interface device 620 may be an add-on card which communicates with the host system 602 memory/CPU through an expansion interface, such as peripheral component interconnect (PCI), PCI-eXtended (PCI-X), PCI-Express (PCIe), or another interface which facilitates communication with the host system 602 e.g., via a peripheral bus. The host system may include a capture device driver 626 to support the exchange of signals via the interface device 620.

In certain implementations, the specialized processing unit may be a field programmable gate array (FPGA), an application specific integrated circuit (ASIC), or another specialized processing unit having dedicated units of logic configured in accordance with principles described herein. The logic units 628 of the specialized processing unit may also include dedicated logic to support various functions for cloud streaming in addition to audio/video capture of the output from an application 608 running on the terminal system 602, such as storage virtualization in coordination with a storage process 632.

In the example depicted in FIGS. 6A-6B, an A/V capture unit embodied in the logic 628 of the specialized processing unit may communicate with the capture device driver 626 in the host system 602, and an A/V process 632 embodied in the host system 602, e.g., a software application running on a central processing unit 604. For example if the terminal system 612 sends video pixels to the video capture device, this video data may make it through the graphics driver 652, the video capture unit contained in the logic 628, the capture device driver 626, to the A/V process 632 embodied in the host system. The A/V process 632 may then compress the captured video frames, and the compression may begin sooner in accordance with an increase in the pixel clock caused by extra pixels. In certain implementations, the video sink 602 may optionally be a streaming server adapted to transmit over a network a stream of video output from the application 608 running on the terminal system 612. For example, the streaming server 602 may include an Ethernet adapter or other network adapter 636, and a corresponding Ethernet driver or other network driver 638 for the operating system of the host 602, with a compatible network library 639 providing protocol support for the network communication. The host system may also include system memory 640, controlled by a corresponding memory driver 642 (e.g., tmpfs) and supported by a file system library 644. A streaming server process 646 may be run on the host system 602 to perform functions associated with provide a real time stream to a client device connected over a network (not pictured in FIGS. 6A-6B).

The terminal system 612 may include various other components to support the application 608, which may be, e.g., video game software designed for an existing embedded platform. The terminal system 612 may include a file system layer 627 to access storage, as well various components to support graphics storage access. In some implementations, systems and the capture device 620 may be configured to implement a storage virtualization technique. An example of such a technique is described in commonly-assigned, co-pending U.S. application Ser. No. 13/135,213, to Roelof Roderick Colenbrander, entitled "MASS STORAGE VIRTUALIZATION FOR CLOUD COMPUTING", filed Dec. 19, 2013, the entire contents of which are herein incorporated by reference.

Figure 7:
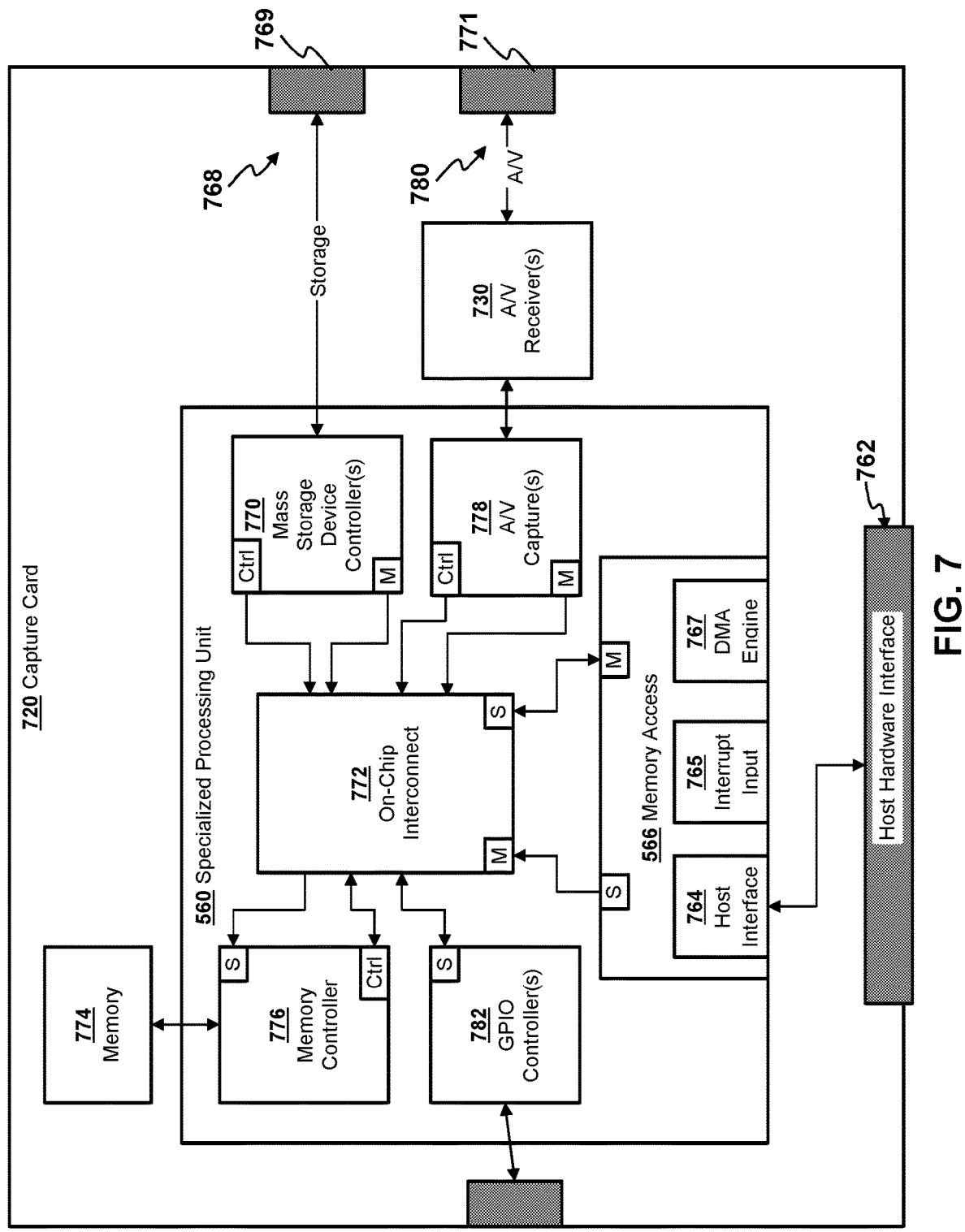
FIG. 7 is a schematic diagram of an example video capture card design having a specialized processing unit.

Turning now to FIG. 7, a schematic diagram of an example capture device 720 that may be implemented on the interface card 620, some components on it, and internals of an example specialized processing unit 760 is depicted in accordance with various implementations of the present disclosure. By way of example, and not by way of limitation, the capture device 720 may be configured as an add-on card having components attached to a printed circuit board (PCB), and the capture card 720 may interface with a peripheral bus of a host system through a host hardware interface 762, such as a peripheral expansion port or other expansion communication interface which allows communication the peripheral bus of a host system when connected.

It is noted that the example capture device 720 of FIG. 7 includes various optional components that are not necessary for video capture, but which may provide additional functionality for cloud computing and other implementations.

The example specialized processing unit 760 may include various blocks of logic dedicated to specialized functionality in accordance with various aspects of the present disclosure. The specialized processing unit may be implemented, e.g., as an FPGA, ASIC, or similar specialized processing unit. The specialized processing unit 760 may include a host interface block 764 which implements part of a protocol stack for the communication interface between the interface card 720 and a peripheral bus of a host system (not pictured in FIG. 7) for the capture device 760.

Communication busses like PCI-Express can be thought of as a protocol stack having several layers. Different communication protocols have different layers. Typically there is an 'application layer' at the top, then some transport related layers in the middle and some physical layer at the bottom. The host interface block 764 need not implement all layers of such a protocol stack. Instead, the host interface block may take care of the physical layer, which is responsible for putting digital information on a communication link, e.g., through electrical or optical signals. The host interface block may also be responsible for portions or possibly all of the 'transport layers' of the protocol stack, but need not be responsible for the application layer.

By way of example, and not by way of limitation, the host interface block 764 may be a hard PCIe block for communication through a PCI-Express connection, and which embeds the protocol stack for a PCIe interface or other interface for accessing a local bus of the host system. The host interface block 764 may be integrated into a memory access interface unit 766 which, together with other logic units of the specialized processing unit 760, may directly access system memory of a host system through the host hardware interface 762, e.g., using an interrupt of the request to the host system.

In some implementations, the memory access interface 766 may include components that provide memory access and interrupt functionality. In particular, the host interface block 764 may be configured to provide a connection between an on-chip-interconnect 772 and the host hardware interface 762 in a way that makes any on-chip device accessible from the host system using memory mapped Input/Output (I/O). This functionality would allow the host system to program any device connected to the on-chip-interconnect 772, such as the mass storage controller 770, memory controller 776, or GPIO 782.

The memory access interface 766 may also include an interrupt connection 765 that allows any connected device, e.g., the A/V capture units 778, to generate an interrupt upon an event (e.g., a captured video frame image is complete). It is desirable for the memory access interface to provide this functionality if there can be only one device interfacing with the host hardware interface hardware 762.

The memory access interface 766 may also (optionally) include a direct memory access (DMA) engine 767. As used herein, and as is generally understood by those skilled in the art, the term direct memory access (DMA) refers to a feature that allows certain hardware subsystems within a computer to access system memory independently of the computer's central processing unit (CPU). The DMA engine 767 may implement data move operations between the host interface block 764 and the host hardware interface 762. In some implementations, the memory access interface unit 766 may implement portions of a protocol stack (e.g., PCI Express) not provided by the host interface block 764, such as connecting the host interface block 764 to the on-chip-interconnect 772.

For purposes of functionality for video capture, the capture device 720 may include one or more video and optionally audio/video communication interfaces 780, which may be implemented in the form of one or more HDMI ports 771 and/or connectors, or other video signal communication interfaces, and which may be attached to a circuit board of the capture device 720. By way of example, and not by way of limitation, the interface card 720 may contain two HDMI ports to facilitate connection to two distinct video sources/terminal systems, although it is noted that the capture device may alternatively contain a different number of video connectors so that a single capture device 720 may service a different number of video sources or terminal systems. For each of the video signal connectors 780, there may be a corresponding video capture unit 778 embodied in the specialized processing unit 760 that is compatible with the particular video communication interface (e.g., HDMI, DVI, VGA, etc.).

The one or more video capture units 778 of the specialized processing unit may be connected to other logic units of the specialized processing unit 760 through the on-chip interconnect 772, which may provide each of the video capture units 778 access to host system interface components (e.g., PCI-Express). The on-chip interconnect may be configured to a standard on-chip bus architecture configured to connect functional blocks on a specialized processing unit (e.g., an FPGA or ASIC). For example, if the specialized processing unit 760 is an FPGA, the components of the specialized processing unit may be interconnected using master-slave architecture, e.g., an Advanced Microcontroller Bus Architecture (AMBA), such as AXI4 or AXI4-Lite, or another suitable on-chip bus architecture. AXI4 may be used for large data transport and AXI-Lite may be used for low performance connections or for configuration purposes. The on-chip interconnections of the specialized processing unit logic blocks may be configured according to a master-slave type configuration as shown in FIG. 7. In the illustrated schematic, "M" and the corresponding bold lines represent represents a master connection, "S" and the corresponding dotted lines represent a slave connection, and "Ctrl" represents control.

The interface device 720 may include one or more memory units 774 which may be controlled by a memory controller 776 provided in the logic of the specialized processing unit 760. The memory unit may support data transport between a terminal system connected through the mass storage interface 768 and a host system connected through the host hardware interface 762, in accordance with data requests issued by the terminal system, e.g., for mass storage virtualization. For example, the memory unit 774 may be a temporary RAM unit, such as DDR3 RAM, or another volatile memory unit configured to temporarily store data requested by read requests issued by the terminal system, in accordance with principles described herein. The memory controller 776 may be connected to the on chip bus architecture 772 to perform memory read/write operations according to signals received from other logical units of the specialized processing unit 760.

During operation, a graphics driver and/or scanout unit of a video source (not pictured in FIG. 7) connected through the video interface 780 may generate enlarged output video frames having extra pixels to be captured by the capture card 720. Upon receiving the video output frames, the video capture unit(s) 778 may be configured to determine when each frame's visible display image pixels have been captured and omit the extra pixels in each frame from capture, discarding these extra pixels because they contain unneeded data. The captured video data for each frame may be transmitted to a video capture process in a host system using an interrupt through the host hardware interface 762 for further processing, compression, and/or transmission over a network. Compression may begin sooner for a given frame rate because a lower proportion of the pixels within each frame need to be transmitted in order to transfer all of the visible image pixels in the frame.

It is noted that each of the one or more A/V capture logic units 778 may be operatively coupled to a corresponding A/V receiver 730, each of which may in turn be connected to a suitable A/V hardware interface 780, such as an HDMI port 771 or other A/V connection port as shown in FIG. 7. A/V output from the terminal system may be connected to the A/V receiver 730 through the A/V interface 780 using a compatible A/V connector. The A/V capture unit 778 may communicate with the interface device driver and A/V process on the host system through the host hardware interface 762, which may be connected to a host system bus (e.g., a peripheral bus), and the host system may then deliver the A/V stream to a client device over a network.

The interface device may optionally include various other components which provide additional functionality for streaming applications run on a terminal system, such as cloud gaming streaming. For example, the specialized processing unit 760 may also include one or more mass storage device controllers 770 for emulating a storage device for one or more terminal systems. The interface device 782 may also include one or more general purpose input/output (GPIO) blocks to support additional functionality. By way of example, and not by way of limitation, each of the GPIO blocks may be connected to a corresponding one of the terminal system to provide additional functionality, such as power control of the terminal systems and other functionality.

As noted above, the specialized processing unit 760 may be implemented, e.g., as an FPGA, ASIC, or other integrated circuit having blocks dedicated to certain functionality, such as A/V capture, a mass storage device controller, memory controller, DMA engine, and the like, in accordance with various aspects of the present disclosure. In certain implementations of the present disclosure, one or more of these units may be provided as reusable units of logic or other chip design commonly referred to in the art as IP blocks or IP cores.

CONCLUSION

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-or step-plus-function limitations, unless such a limitation is explicitly recited in a given claim using the phrase "means for."

What is claimed is:

1. A method comprising:
rendering a plurality of source frames at a variable frame rate;
compressing one or more source frames of the plurality of source frames; and
compensating for one or more fluctuations of the variable frame rate by adjusting a timing of the compressing of the one or more source frames to better match the frame rate at which the one or more source frames are rendered in response to the one or more fluctuations in the variable frame rate.

2. The method of claim 1, further comprising:
capturing the one or more source frames before said compressing the one or more source frames.

3. The method of claim 1, further comprising:
capturing the one or more source frames before said compressing the one or more source frames; and
sending resulting one or more compressed frames to one or more remote devices over a network.

4. The method of claim 1,
wherein the one or more fluctuations include one or more downward fluctuations in which the variable frame rate decreases,
wherein said adjusting the timing of the compressing includes delaying a scan out in response to the downward fluctuations.

5. The method of claim 1, further comprising:
placing a marker into a memory unit after each of the one or more source frames are rendered into a frame buffer,
wherein detecting the one or more fluctuations includes tracking a time at which the marker for each of the one or more source frames is placed into the memory unit.

6. The method of claim 1,
wherein said adjusting the timing of the compressing includes putting a scanout unit to sleep for a period of time.

7. The method of claim 1,
wherein said adjusting the timing of the compressing includes delaying scanout of at least one output frame by changing a register value to a value that delays scanout.

8. The method of claim 1,
wherein the one or more fluctuations include one or more downward fluctuations in which the variable frame rate decreases,
wherein said adjusting the timing of the compressing includes disabling a display interface in response to the one or more downward fluctuations.

9. A system comprising:
at least one processor unit;
at least one memory unit coupled to the processor unit; and
wherein the processor unit is configured to perform a method, the method comprising:
rendering a plurality of source frames at a variable frame rate;
compressing one or more source frames of the plurality of source frames; and
compensating for one or more fluctuations of the variable frame rate by adjusting a timing of the compressing of the one or more source frames to better match the frame rate at which the one or more source frames are rendered in response to the one or more fluctuations in the variable frame rate.

10. The system of claim 9, wherein the method further comprises:

capturing the one or more source frames before said compressing the one or more source frames.

11. The system of claim 9, wherein the method further comprises:
    capturing the one or more source frames before said compressing the one or more source frames; and
    sending resulting one or more compressed frames to one or more remote devices over a network.

12. The system of claim 9,
    wherein the one or more fluctuations include one or more downward fluctuations in which the variable frame rate decreases,
    wherein said adjusting the timing of the compressing includes delaying a scan out in response to the downward fluctuations.

13. The system of claim 9, wherein the method further comprises:
    placing a marker into a memory unit after each of the one or more source frames are rendered into a frame buffer,
    wherein detecting the one or more fluctuations includes tracking a time at which the marker for each of the one or more source frames is placed into the memory unit.

14. The system of claim 9,
    wherein said adjusting the timing of the compressing includes putting a scanout unit to sleep for a period of time.

15. The system of claim 9,
    wherein said adjusting the timing of the compressing includes delaying scanout of at least one output frame by changing a register value to a value that delays scanout.

16. The system of claim 9,
    wherein the one or more fluctuations include one or more downward fluctuations in which the variable frame rate decreases,
    wherein said adjusting the timing of the compressing includes disabling a display interface in response to the one or more downward fluctuations.

17. A non-transitory computer readable medium having processor-executable instructions embodied therein, wherein execution of the instructions by a processor causes the processor to implement a method, the method comprising
    rendering a plurality of source frames at a variable frame rate;
    compressing one or more source frames of the plurality of source frames; and
    compensating for one or more fluctuations of the variable frame rate by adjusting a timing of the compressing of the one or more source frames to better match the frame rate at which the one or more source frames are rendered in response to the one or more fluctuations in the variable frame rate.

18. The non-transitory computer readable medium of claim 17,
    wherein the one or more fluctuations include one or more downward fluctuations in which the variable frame rate decreases,
    wherein said adjusting the timing of the compressing includes delaying a scan out in response to the downward fluctuations.

19. The non-transitory computer readable medium of claim 17,
    wherein the one or more fluctuations include one or more downward fluctuations in which the variable frame rate decreases,
    wherein said adjusting the timing of the compressing includes delaying a scan out in response to the downward fluctuations by putting a scanout unit to sleep for a period of time.

* * * * *